(No Model.)

F. C. RANDALL.
OATMEAL MILL.

No. 262,616. Patented Aug. 15, 1882.

Witnesses.
Thos. H. Hutchins.
Wm. J. Hutchins.

Inventor.
Frank C. Randall.

UNITED STATES PATENT OFFICE.

FRANK C. RANDALL, OF JOLIET, ILLINOIS.

OATMEAL-MILL.

SPECIFICATION forming part of Letters Patent No. 262,616, dated August 15, 1882.

Application filed May 23, 1882. (No model.)

*To all whom it may concern:*

Be it known that I, FRANK C. RANDALL, of the city of Joliet, in Will county, and State of Illinois, have invented certain new and useful Improvements in Oatmeal-Mills, the construction and operation of which I will proceed to explain, reference being had to the annexed drawings, making a part of this specification, in which—

Figure 1:
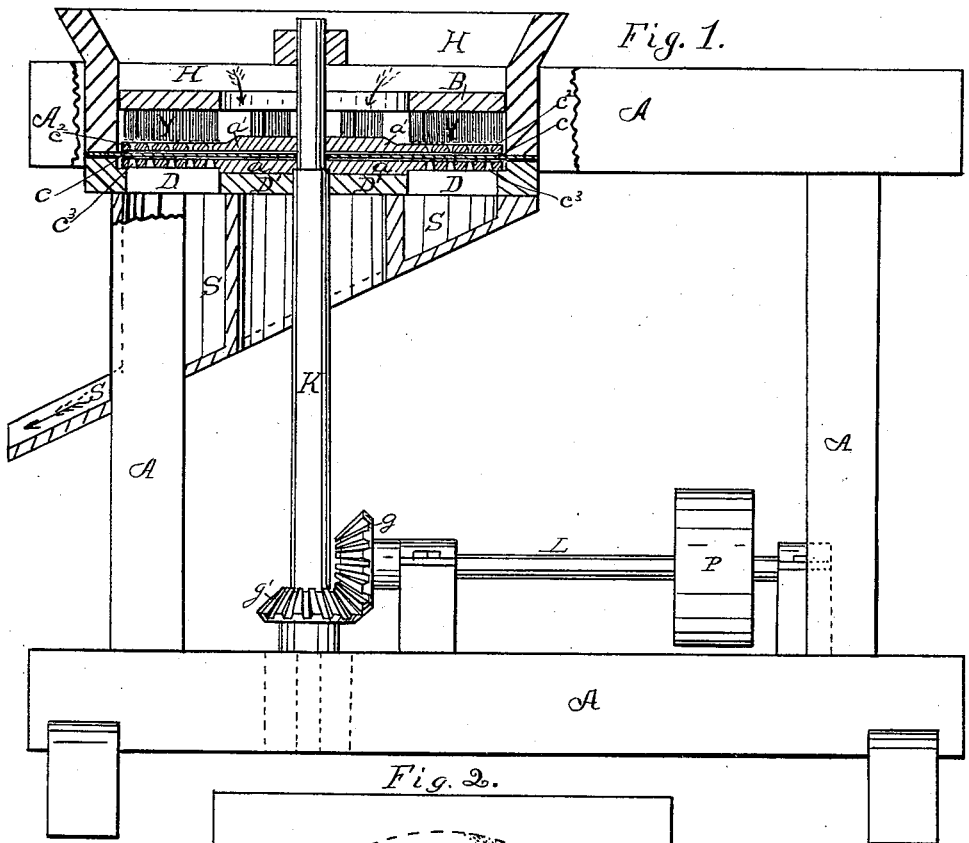
Figure 3:
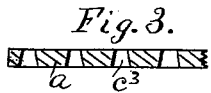
Figure 2:
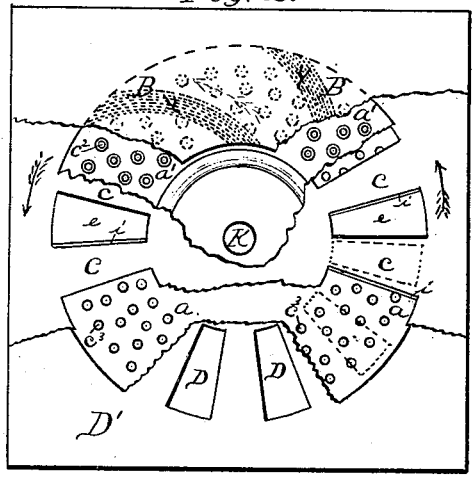
Figure 4:
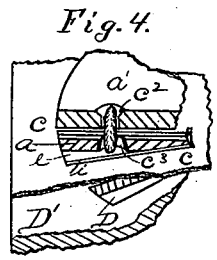

Figure 1 is a vertical sectional view; Fig. 2, a top plan view; Fig. 3, a cross-sectional view of a portion of the lower runner, $a$, showing the shape of its perforations; and Fig. 4 is a perspective view of a broken-away portion of the revolving disks and stationary knife, showing the manner in which the oat falls down into the openings ready to be cut by the knife.

The object and nature of this invention are to cut and break the kernels of the oats into two or more parts without grinding it fine like flour, but leaving it cracked and coarse after the husk has first been removed by some previous process.

In the drawings, A represents the supporting-frame or husk of the mill, which contains and supports the hoop H, containing the working parts of the machine.

K is the spindle, which supports and drives the runners by means of the power applied to the pulley P on the counter-shaft L, which operates the bevel-gears $g$ and $g'$. The spindle K stands in a step in the frame A in the usual manner.

The runners $a$ and $a'$ are perforated, as shown, in such manner that the perforations in the lower runner, $a$, are exactly below those in the upper runner, $a'$. These runners $a$ and $a'$ have arranged between them a stationary plate, $c$, so arranged that the two runners $a$ and $a'$ very nearly rub its two surfaces. This stationary plate $c$ is provided with radial apertures or openings. (Shown at $e$ in Fig. 2.) One edge, $i$, of these radial apertures is sharpened into a knife-edge, which does the cutting of the grain. These apertures $e$ are at equal distances from each other and arranged concentrically with the runners $a$ and $a'$.

Immediately below the stationary plate $c$ is another plate $D'$, which forms the floor of the hoop H, and is provided with a set of apertures similar to those of plate $c$, which are arranged between the apertures $e$ of the plate $c$ and form the discharge-openings for the grain into the discharge-spout $s$ below.

Immediately above the runner $a'$ is a stationary plate, B, having a central opening or eye, through which the grain is fed into the mill. This plate B is elevated high enough above the runner $a'$ to permit the attachment to its lower surface of the brushes $y$, arranged to extend from the eye to a line corresponding with the periphery of the runner $a'$ in a curved manner, as shown in Fig. 2, so that as the runner $a'$ rotates the brushes $y$ will sweep the grain toward the periphery of the runner $a'$ and into the perforations $c^2$ of said runner. The perforations $c^2$ of the runner $a'$ are countersunk at the upper end to freely admit the kernels, while the perforations $c^3$ of the lower runner, $a$, are reamed out, as shown at Fig. 3, at their lower ends to readily discharge the grain. The runners $a$ and $a'$ are intended to be constructed of thin metal, as is also the stationary intermediate plate, $c$.

The mode of operation is as follows: The grain, after it has first been hulled, is fed into the mill through the central eye of the stationary plate B onto the runner $a'$, which, by its centrifugal force, and with the assistance of the brushes $y$, sweeps the kernels into the perforations $c^2$ and down far enough to reach into the perforations $c^3$ of the lower runner, $a$, while these perforations are opposite the apertures $e$ of the plate $c$, as shown in Fig. 4, said kernels resting on the plate $D'$ while they are coming into contact with the knife-edges $i$ of the plate $c$. The runners rotate in the direction of the arrows, and when the kernels are in the perforations of the runners $a$ and $a'$, as shown in Fig. 4, they are cut into two parts by coming in contact with the knife-edges $i$ of the plate $c$. The cut-off lower portions of the kernels then drop below and are discharged through the apertures D of the plate $D'$ into the spout $s$ below. The remaining upper portions of the kernels will finally fall through the perforations and be discharged in like manner. By this means the grain is not ground, but simply cut in smaller parts of any size desired by adjusting the runners and plates to or from each other.

Having thus described my invention, what

I claim as new, and desire to secure by Letters Patent, is as follows, to wit:

1. In the mill described, the combination of the spindle K, perforated runners $a$ and $a'$, perforated stationary plate D', perforated stationary plate $c$, provided with the knife-edges $i$, stationary plate B, provided with the brushes $y$, and central eye, husk A, and hoop H, arranged to operate in the manner and for the purpose set forth.

2. In the mill described, the combination of the runners $a$ and $a'$, having the perforations $c^2$ and $c^3$ arranged opposite to each other, the intermediate stationary perforated plate, $c$, having the knife-edges $i$, and spindle $k$, as and for the purpose set forth.

3. In the mill described, the runner $a'$, provided with the perforations $c^2$, in combination with the runners $a$, provided with the perforations $c^3$, having their lower ends reamed out, perforated plate $c$, having knife-edges $i$, and spindle K, all arranged to operate in the manner and for the purpose set forth.

FRANK C. RANDALL.

Witnesses:
WM. J. HUTCHINS,
THOS. H. HUTCHINS.